(12) United States Patent
Hoshi et al.

(10) Patent No.: US 7,310,961 B2
(45) Date of Patent: Dec. 25, 2007

(54) HEAT EXCHANGE APPARATUS AND HYBRID VEHICLE INCLUDING HEAT EXCHANGE APPARATUS

(75) Inventors: Jun Hoshi, Toyota (JP); Minobu Mizuno, Toyota (JP); Mitsuru Kimata, Nishikasugai-gun (JP); Susumu Ichikawa, Kariya (JP); Keiichi Yoshii, Anjo (JP); Akira Yamanaka, Gifu (JP); Yoshihiko Sonoda, Tokoname (JP); Hiroshi Nonoyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 215 days.

(21) Appl. No.: 11/150,140

(22) Filed: Jun. 13, 2005

(65) Prior Publication Data

US 2005/0279113 A1    Dec. 22, 2005

(30) Foreign Application Priority Data

Jun. 16, 2004    (JP) .............................. 2004-178603

(51) Int. Cl.
    *B60H 1/32*    (2006.01)
(52) U.S. Cl. .......................................... 62/244; 165/42
(58) Field of Classification Search .................. 62/244; 165/42–43
    See application file for complete search history.

(56) References Cited

U.S. PATENT DOCUMENTS

| | | | | | |
|---|---|---|---|---|---|
| 4,651,816 | A | * | 3/1987 | Struss et al. | 165/76 |
| 4,756,279 | A | * | 7/1988 | Temmesfeld | 123/41.04 |
| 6,106,228 | A | * | 8/2000 | Bartlett | 415/146 |
| 6,874,570 | B2 | * | 4/2005 | Horiuchi | 165/140 |
| 6,978,628 | B2 | * | 12/2005 | Honda | 62/134 |
| 2005/0257563 | A1 | | 11/2005 | Hoshi et al. | |

FOREIGN PATENT DOCUMENTS

| | | |
|---|---|---|
| JP | U-60-110625 | 7/1985 |
| JP | A-10-317963 | 12/1998 |
| JP | A-2000-018880 | 1/2000 |
| JP | A-2001-174168 | 8/2001 |

* cited by examiner

*Primary Examiner*—William E. Tapolcai
(74) *Attorney, Agent, or Firm*—Kenyon & Kenyon LLP (57) ABSTRACT

A heat exchange portion is configured by arranging a condenser for air conditioning, an EV radiator, and a FC radiator in one plane substantially perpendicular to a direction in which a fuel cell vehicle moves, at a front portion of the fuel cell vehicle, in order of an operating temperature, from an upper position to a lower position. A fan is provided behind the heat exchange portion such that a center thereof is closer to the condenser than to the FC radiator. In addition, a fan shroud is provided, in which plural ram pressure holes are formed in a portion which covers the FC radiator.

15 Claims, 6 Drawing Sheets

HEAT EXCHANGE APPARATUS AND HYBRID VEHICLE INCLUDING HEAT EXCHANGE APPARATUS

INCORPORATION BY REFERENCE

The disclosure of Japanese Patent Application No. 2004-178603 filed on Jun. 16, 2004, including the specification, drawings and abstract is incorporated herein by reference in its entirety.

BACKGROUND OF THE INVENTION

1. Field of the Invention

The invention relates to a heat exchange apparatus and a hybrid vehicle including the heat exchange apparatus. More specifically, the invention relates to a heat exchange apparatus installed in a moving body, and a hybrid vehicle as the moving body including the heat exchange apparatus.

2. Description of the Related Art

An example of such a heat exchange apparatus is disclosed in Japanese Patent Application Publication No. JP (A) 2001-174168. As shown in FIG. 1 of the Japanese Patent Application Publication No. JP (A) 2001-174168, the heat exchange apparatus includes two heat exchangers, that are, a heat exchanger for an electronic component (hereinafter, referred to as "electronic component heat exchanger") through which coolant for the electronic component flows, and a heat exchanger for a cooling medium (hereinafter, referred to as "cooling medium heat exchanger") through which a cooling medium for a freezing cycle flows, the two heat exchangers being arranged in one plane. In this heat exchange apparatus, the electronic component heat exchanger is arranged in an upper position, and the cooling medium heat exchanger is arranged in a lower position; and a passage for the cooling medium in the cooling medium heat exchanger is a winding passage that extends from an upper position to a lower position, and has three levels, and the lowest portion is a condensing portion. Thus, an amount of heat transmitted to the condensing portion from the electronic component heat exchanger is decreased. Accordingly, it becomes unnecessary to provide a thermal insulation portion between the electronic component heat exchanger and the cooling medium heat exchanger.

Another example of the heat exchange apparatus is disclosed, in which a heat exchanger for air conditioning (hereinafter, referred to as "air conditioning heat exchanger"), a heat exchanger for a driving source (hereinafter, referred to as "driving source heat exchanger"), and an electronic component heat exchanger are arranged in series so as to overlap each other in a direction in which air is introduced when a vehicle runs, at a front portion of the vehicle. In this apparatus, the electronic component heat exchanger is arranged in a foremost position, and the air conditioning heat exchanger and the driving source heat exchanger are arranged behind the electronic component heat exchanger.

A heat exchange apparatus installed in a moving body such as a hybrid vehicle includes an air conditioning heat exchanger used for air conditioning in a passenger compartment, a driving source heat exchanger used for cooling a driving source for moving the moving body, and an electronic component heat exchanger for cooling an electronic component. The air conditioning heat exchanger, the driving source heat exchanger, and the electronic component heat exchanger may not perform cooling sufficiently depending on positions in which these heat exchangers are arranged, and a moving condition of the moving body. A required heat radiation amount of the air conditioning heat exchanger is constant if a heat load in the passenger compartment is constant, irrespective of a moving speed of the moving body. Meanwhile, a required heat radiation amount of the driving source heat exchanger increases with an increase in a load of the driving source. Therefore, the required heat radiation amount of the driving source heat exchanger changes according to the moving speed and acceleration of the moving body. Similarly, a required heat radiation amount of the electronic component heat exchanger increases with an increase in a load of the electronic component, which is caused by an increase in the moving speed and the acceleration of the moving body. Therefore, the required heat radiation amount of the electronic component heat exchanger changes according to the moving speed and the acceleration of the moving body. Accordingly, it is necessary to consider arrangement of the air conditioning heat exchanger, the driving source heat exchanger, and the electronic component heat exchanger, and a position in which a fan for promoting introduction of outside air is fitted.

In a heat exchange apparatus including heat exchangers that are arranged in series in a direction in which air is introduced, at a front portion of a vehicle, when a heat exchanger in a front position among the heat exchangers arranged in series radiates heat, a temperature of air increases due to heat radiated by the heat exchanger in the front position. Therefore, in a heat exchanger in a rear position, a temperature of LLC (long life coolant) or a cooling medium flowing in the heat exchanger becomes close to a temperature of air flowing in the heat exchanger. As a result, the heat radiation amount of the heat exchanger in the rear position decreases. Particularly under a certain running condition, a difference between outside air temperature and a temperature of the LLC flowing into the driving source heat exchanger may become only approximately 40° C. Under this condition, the heat radiation amount of the driving source heat exchanger decreases by approximately 20% due to heat radiated by the heat exchanger in the front position.

SUMMARY OF THE INVENTION

It is an object of the invention to more appropriately arrange a heat exchanger for air conditioning which is used in an air conditioning system for a passenger compartment of a moving body and a heat exchanger for a driving source which is used for cooling the driving source of the moving body, in a heat exchange apparatus. It is another object of the invention to cause a heat exchanger for air conditioning which is used in an air conditioning system for a passenger compartment of a moving body to function more efficiently, and to cause a heat exchanger for a driving source which is used for cooling the driving source of the moving body to function more efficiently, in a heat exchange apparatus. It is yet another object of the invention to cause a heat exchanger for air conditioning which is used in an air conditioning system for a passenger compartment of a moving body to function more efficiently according to movement of the moving body, and to cause a heat exchanger for a driving source which is used for cooling the driving source of the moving body to function more efficiently according to movement of the moving body, in a heat exchange apparatus. It is yet another object of the invention to more appropriately arrange a heat exchanger for air conditioning which is used in an air conditioning system for a passenger compartment and a heat exchanger for a driving source which is used for cooling the driving source, and to cause the heat exchangers to function more efficiently, in a hybrid vehicle.

In order to achieve at least a part of the aforementioned objects, a heat exchange apparatus according to the invention, and a hybrid vehicle including the heat exchange apparatus according to the invention are configured as follows.

A first aspect of the invention relates to a heat exchange apparatus which is installed in a moving body. The heat exchange apparatus includes a heat exchange portion in which plural heat exchangers including a heat exchanger for air conditioning that is used in an air conditioning system for a passenger compartment of the moving body and a heat exchanger for a driving source that is used for cooling the driving source of the moving body are arranged in one plane substantially perpendicular to a direction in which the moving body moves, at a front portion of the moving body; a fan which is arranged behind the heat exchanger for air conditioning in the heat exchange portion; a fan shroud which is provided so as to cover at least the heat exchanger for air conditioning; and a hole form member which is provided behind at least the heat exchanger for the driving source, and in which a ram pressure hole is formed.

In the heat exchange apparatus, the plural heat exchangers including the heat exchanger for air conditioning that is used in an air conditioning system for the passenger compartment of the moving body and the heat exchanger for the driving source that is used for cooling the driving source of the moving body are arranged in one plane substantially perpendicular to the direction in which the moving body moves, at the front portion of the moving body. Therefore, cooling air that is introduced when the moving body moves can be supplied directly to the heat exchanger for air conditioning and the heat exchanger for the driving source. Accordingly, the heat exchanger for air conditioning and the heat exchanger for the driving source can be caused to function more efficiently. That is, the heat exchanger for air conditioning and the heat exchanger for the driving source can be more appropriately arranged. Also, since the fan is provided behind the heat exchanger for air conditioning in the heat exchange portion, and the fan shroud is provided so as to cover at least the heat exchanger for air conditioning, it is possible to supply cooling air to the heat exchanger for air conditioning even when a moving speed of the moving body is low. As a result, it is possible to cause the heat exchanger for air conditioning to function efficiently. Further, since the hole form member in which the ram pressure hole is formed is provided behind at least the heat exchanger for the driving source, it is possible to supply a large amount of cooling air to the heat exchanger for the driving source when the moving speed of the moving body is high. As a result, it is possible to cause the heat exchanger for the driving source to function efficiently. An example of the moving body includes a hybrid vehicle.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF THE PREFERRED EMBODIMENTS

Next, an exemplary embodiment of the invention will be described.

Figure 1:
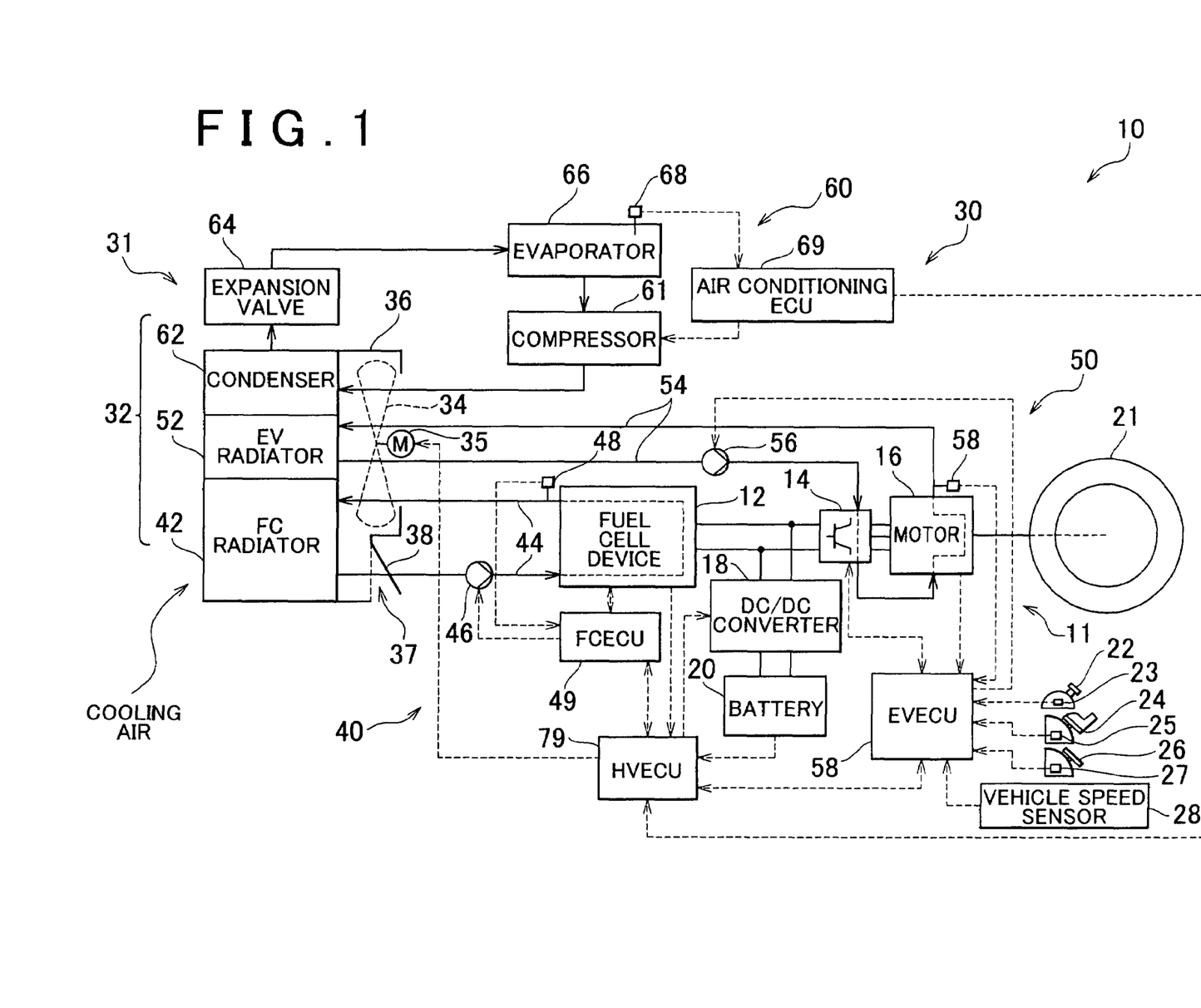
FIG. 1 is a diagram showing an outline of a configuration of a fuel cell vehicle 10 including a cooling system 30 that includes a heat exchange apparatus 31 according to an embodiment of the invention.
Figure 2:
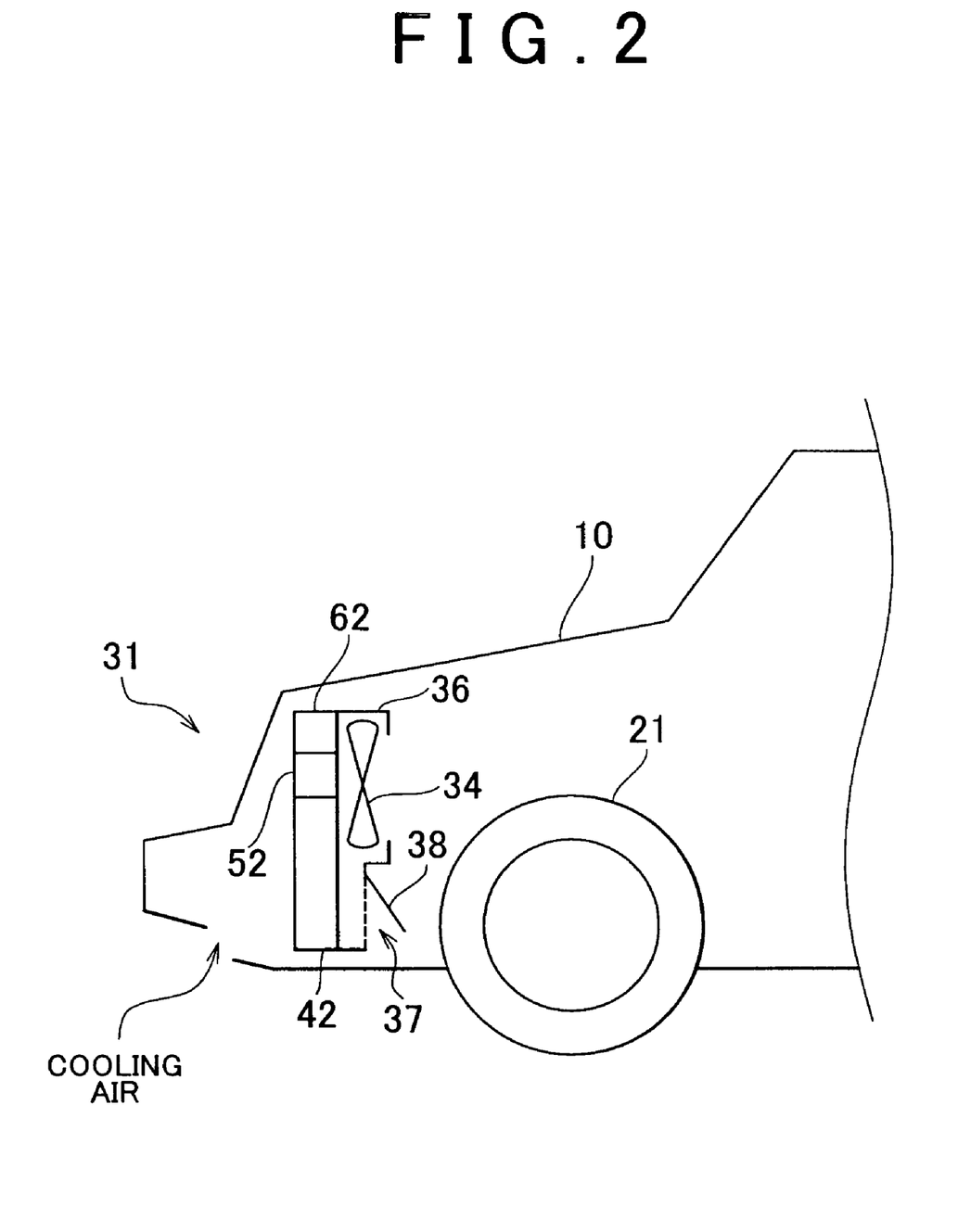
FIG. 2 is an explanatory diagram showing an example of arrangement of heat exchangers of the cooling system 31 according to the embodiment of the invention.

FIG. 1 is a diagram showing an outline of a configuration of a fuel cell vehicle 10 including a cooling system 30 that includes a heat exchange apparatus 31 according to an embodiment of the invention. FIG. 2 is an explanatory diagram showing an example of arrangement of heat exchangers in the heat exchange apparatus 31 according to the embodiment of the invention. The fuel cell vehicle 10 in the embodiment includes a driving system 11 and a cooling system 30. The driving system 11 includes a fuel cell device 12 including a polymer electrolyte fuel cell stack as an electric power source; an inverter 14 which converts direct electric current from the fuel cell device 12 to three phase alternating current; a motor for running 16 which drives a driving wheel 21 using the three phase alternating current from the inverter 14; a DC/DC converter 18 which is connected to two lines connecting the motor for running 16 to the fuel cell device 12; and a battery 20 which is charged with electric current, and from which electric current is discharged using the DC/DC converter 18. The cooling system 30 includes a cooling system for a fuel cell (hereinafter, referred to as "FC cooling system") 40 which cools a fuel cell stack (not shown) of the fuel cell device 12; a cooling system for driving devices (hereinafter, referred to as "driving device cooling system) 50 which cools the inverter 14 and the motor for running 16; an air conditioning cooling system 60 which is a part of air conditioning equipment for a passenger compartment; and a fan 34 which is arranged behind a radiator. The heat exchange apparatus 31 in the embodiment includes heat exchangers for the FC cooling system 40, the driving device cooling system 50, and the air conditioning cooling system 60. The heat exchange apparatus 31 will be described in detail later. In order to make description easier, first, the FC cooling system 40, the driving device cooling system 50, and the air conditioning cooling system 60 will be described. Then, the heat exchange apparatus 31 in this embodiment will be described in detail.

The FC cooling system 40 includes a radiator for the fuel cell (hereinafter, referred to as "FC radiator") 42; a communication pipe 44; a pump 46; a temperature sensor 48; and an electronic control unit for the fuel cell (hereinafter, referred to as "FCECU") 49. The FC radiator 42 cools coolant that is a cooling medium using heat exchange with the cooling air that is introduced when the vehicle runs. The communication pipe 44 connects a coolant passage of the FC radiator 42 to a coolant passage formed in the fuel cell stack such that a circulation passage is formed. The pump 46 is provided in the communication pipe 44, and circulates the coolant in the circulation passage. The temperature sensor 48 is fitted to the communication pipe 44 at a portion in the vicinity of an outlet of the fuel cell stack, and detects a coolant temperature Twfc. The FCECU 49 controls driving of the pump 46 based on the coolant temperature Twfc detected by the temperature sensor 48, and sets a request Frq1 relating to driving of the fan 34 (hereinafter, referred to as "driving request Frq1 for the fan 34") based on the coolant temperature Twfc. In this embodiment, the FCECU 49 selects and sets one of "a high level", "a medium level", "a low level", and "stop", as the driving request Frq1 for the fan 34. The FCECU 49 not only controls driving of the pump 46 in the FC cooling system 40 and sets the driving request Frq1 for the fan 34, but also controls operation of the fuel cell device 12. Accordingly, the FCECU 49 serves as both of a control device for the FC cooling system 40 and a control device for the fuel cell device 12 in the driving system 11.

The driving device cooling system 50 includes a radiator for an electric vehicle (EV) (hereinafter, referred to as "EV radiator") 52; a communication pipe 54; a pump 56; a temperature sensor 58; and an electronic control unit for the EV (hereinafter, referred to as "EVECU") 59. The EV radiator 52 cools the coolant that is the cooling medium using heat exchange with the cooling air that is introduced when the vehicle runs. The communication pipe 54 connects a coolant passage of the EV radiator 52 to coolant passages formed in the inverter 14 and the motor for running 16 such that a circulation passage is formed. The pump 56 is provided in the communication pipe 54, and circulates the coolant in the circulation passage. The temperature sensor 58 is fitted to the communication pipe 54 at a portion in the vicinity of an outlet of the motor for running 16, and detects a coolant temperature Twmg. The EVECU 59 controls driving of the pump 56 based on the coolant temperature Twmg detected by the temperature sensor 58, and sets a request Frq2 relating to driving of the fan 34 (hereinafter, referred to as "driving request Frq2 for the fan 34") based on the coolant temperature Twmg. The EVECU 59 selects and sets one of "the high level", "the medium level", "the low level", and "stop", as the driving request Frq2 for the fan 34, as in the case of the driving request Frq1. The EVECU 59 not only controls driving of the pump 56 in the driving device cooling system 50 and sets the driving request Frq2 for the fan 34, but also calculates driving torque to be output to the driving wheel 21, and controls the inverter 14 such that the calculated driving torque is output from the motor for running 16. The EVECU 59 calculates the driving torque based on a position of a shift lever 22 detected by a shift position sensor 23; an accelerator pedal operation amount corresponding to a depression amount of an accelerator pedal 24, which is detected by an accelerator pedal position sensor 25; a brake pedal position showing a depression amount of a brake pedal 26, which is detected by a brake pedal position sensor 27; a vehicle speed V detected by a vehicle speed sensor 28; a rotational position of a rotor of the motor for running 16, which is detected by a rotational position detection sensor (not shown); phase current applied to the motor for running 16, which is detected by a current sensor (not shown) fitted in the inverter 14, and the like. Accordingly, the EVECU 59 serves as both of a control device for the driving device cooling system 50 and a control device for the motor for running 16 in the driving system 11.

The air conditioning cooling system 60 is configured as a circulation passage in which the cooling medium is circulated. The air conditioning cooling system 60 includes a compressor 61; a condenser 62; an expansion valve 64; an evaporator 66; and an electronic control unit for air conditioning (hereinafter, referred to as "air conditioning ECU") 69. The compressor 61 compresses the cooling medium so that the cooling medium is brought into a high-temperature and high-pressure gas state. The condenser 62 cools the compressed cooling medium using outside air so that the cooling medium is brought into a high-pressure liquid state. The expansion valve 64 rapidly expands the cooled cooling medium so that the cooling medium is brought into a low-temperature and low-pressure mist state. The evaporator 66 evaporates the low-temperature and low-pressure cooling medium using heat exchange between the low-temperature and low-pressure cooling medium and air in the passenger compartment so that the cooling medium is brought into a low-temperature and low-pressure gas state. The air conditioning ECU 69 controls driving of the compressor 61 based on a temperature of the cooling medium, which is detected by a cooling medium temperature sensor 68 fitted to the evaporator 66. Also, the air conditioning ECU 69 sets a request Frq3 relating to driving of the fan 34 (hereinafter, referred to as "driving request Frq3 for the fan 34"), based on the temperature of the cooling medium. The air conditioning ECU 69 selects and sets one of "the high level", "the medium level", "the low level", and "stop", as the driving request Frq3 for the fan 34, as in the cases of the driving requests Frq1 and Frq2.

The heat exchange apparatus 31 in the embodiment includes a heat exchange portion 32, the fan 34, a motor 35, and a fan shroud 36. The heat exchange portion 32 includes the FC radiator 42 in the FC cooling system 40, the EV radiator 52 in the driving device cooling system 50, and the condenser 62 in the air conditioning cooling system 60. The fan 34 is arranged behind the heat exchange portion 32. The motor 35 drives the fan 34. Plural ram pressure holes are formed in the fan shroud 36.

In the heat exchange portion 32, the condenser 62, the EV radiator 52, and the FC radiator 42 are arranged in one plane substantially perpendicular to a direction in which the fuel cell vehicle 10 moves forward at a front portion of the fuel cell vehicle 10, as shown in FIG. 2. Also, the heat exchangers are arranged in order of the condenser 62, the EV radiator 52, and the FC radiator 42, that is, in order of an operating temperature at the time of heat exchange, from an upper position to a lower position. In this embodiment, the operating temperature of the condenser 62 at the time of heat exchange is 40° C. to 60° C., the operating temperature of the EV radiator 52 at the time of heat exchange is 50° C. to 70° C., and the operating temperature of the FC radiator 42 at the time of heat exchange is 65° C. to 85° C. Since the heat exchangers in the cooling systems 40, 50, and 60 (i.e., the FC radiator 42, the EV radiator 52, and the condenser 62) are arranged in one plane in this embodiment, the cooling air that is introduced when the vehicle runs can be caused to act directly on the FC radiator 42, the EV radiator 52, and the condenser 62. Also, since the heat exchangers are arranged in order of the condenser 62, the EV radiator 52, and the FC radiator 42, that is, in order of the operating temperature at the time of heat exchange, it is possible to suppress heat transmission from the FC radiator 42 whose operating temperature is high to the condenser 62 whose operating temperature is low.

The fan 34 is provided such that a center of the fan 34 is closer to the condenser 62 than to the FC radiator 42. Therefore, an amount of cooling air that is supplied to the condenser 62 and the EV radiator 52 by the fan 34 can be made large. Driving of the motor 35 is controlled by an electronic control unit for a hybrid vehicle (HV) (hereinafter, referred to as "HVECU") 79 based on the driving requests Frq1, Frq2, and Frq3 from the FCECU 49, the EVECU 59, and the air conditioning ECU 69. The HVECU 79 communicates with the FCECU 49, the EVECU 59, and the air conditioning ECU 69 which function as control devices for the FC cooling system 40, the driving device cooling system 50, and the air conditioning cooling system 60, respectively.

The fan shroud 36 is fitted to the heat exchange portion 32 so as to cover the condenser 62, the EV radiator 52, and the FC radiator 42, and to surround the fan 34. Plural ram pressure holes 37 are formed in a portion of the fan shroud 36, which covers the FC radiator 42. Also, an opening/closing member 38 having a plate shape is fitted to the portion of the fan shroud 36, which covers the FC radiator 42. The opening/closing member 38 opens/closes the plural ram pressure holes 37 that are formed in the fan shroud 36, using force of air. Accordingly, when a vehicle speed of the fuel cell vehicle 10 is low, the opening/closing member 38 closes the ram pressure holes 37. When the vehicle speed of the fuel cell vehicle 10 is high, the opening/closing member 38 opens the ram pressure holes 37.

Figure 3:
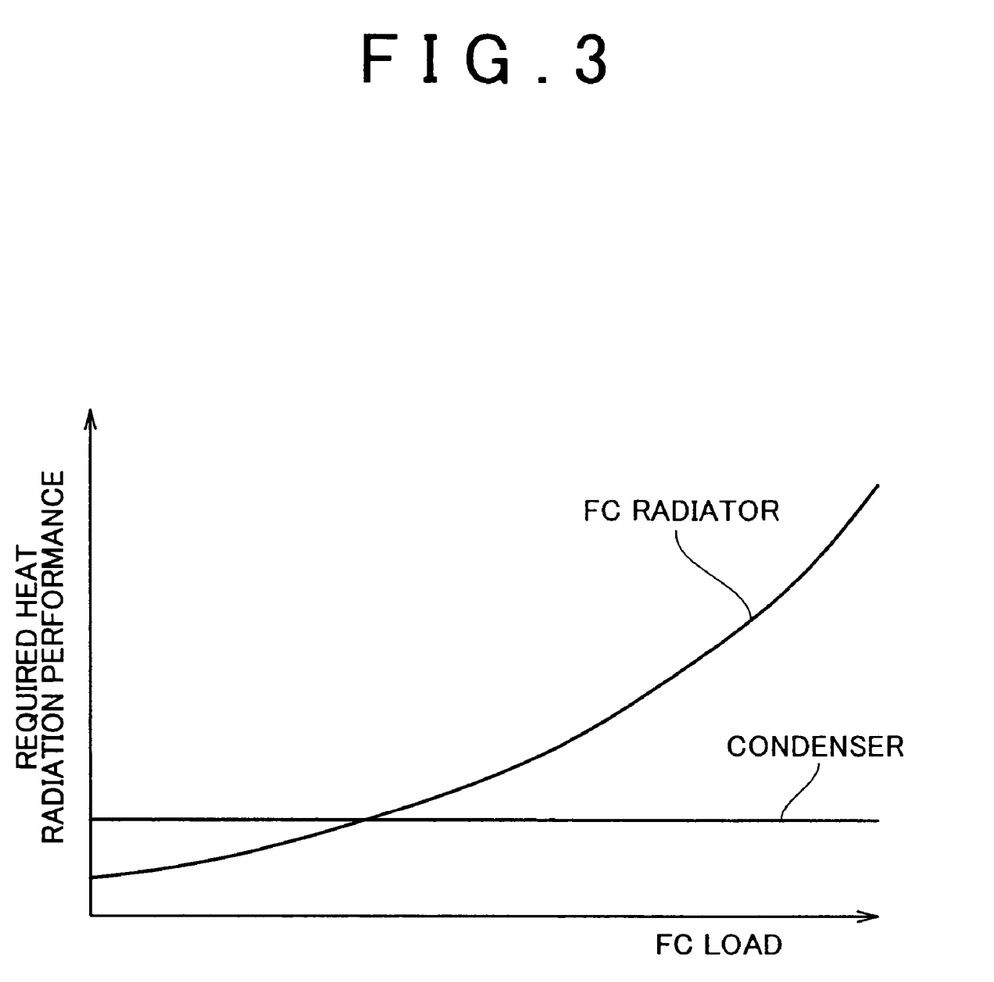
FIG. 3 is a graph showing an example of a relationship between a FC load, and heat radiation performance required of a FC radiator 42 and heat radiation performance required of a condenser 62.

Next, a function of the heat exchange apparatus 31 will be described. Performance required of the heat exchange apparatus 31, that is, performance (particularly, heat radiation performance) required of each of the FC radiator 42, the EV radiator 52, and the condenser 62 varies depending on the vehicle speed of the fuel cell vehicle 10, and operating states of the fuel cell device 12, the motor for running 16, and the like. The heat radiation performance required of the condenser 62 varies depending on a temperature of a passenger room. However, the heat radiation performance required of the condenser 62 does not vary depending on the vehicle speed V. The heat radiation performance required of the FC radiator 42 increases with an increase in a load of the fuel cell device 12 (FC load). Since the load of the fuel cell device 12 increases with an increase in the vehicle speed V, the heat radiation performance required of the FC radiator 42 increases with an increase in the vehicle V. FIG. 3 is a graph showing an example of a relationship between the FC load, and heat radiation performance required of the FC radiator 42 and heat radiation performance required of the condenser 62. The heat radiation performance required of the EV radiator 52 is decided based on torque output from the motor for running 16 and electric current flowing in the inverter 14. The heat radiation performance required of the EV radiator 52 tends to increase with an increase in the vehicle speed V. However, the heat radiation performance required of the EV radiator 52 increases to a small extent with an increase in the vehicle speed V, as compared to the heat radiation performance required of the FC radiator 42. Meanwhile, a certain level of heat radiation performance is required of the EV radiator 52 even when the vehicle speed V is low, for example, when the vehicle takes off. Considering these facts, air of an amount corresponding to the vehicle speed V needs to pass through the FC radiator 42. Air of an amount which substantially corresponds to the vehicle speed V needs to pass through the EV radiator 52. Meanwhile, a certain amount of air needs to pass through the EV radiator 52 even when the vehicle speed V is low. A certain amount of air needs to pass through the condenser 62, irrespective of the vehicle speed V. In the heat exchange apparatus 31 in the embodiment, the fan 34 is provided such that the center of the fan 34 is closer to the condenser 62 than to the FC radiator 42, the condenser 62 and the FC radiator 42 being in the heat exchange portion 32 in which the FC radiator 42, the EV radiator 52, and the condenser 62 are arranged in one plane. In addition, the fan shroud 36 is provided, and the plural ram pressure holes 37 are formed in the portion of the fan shroud 36, which covers the FC radiator 42. That is, when the vehicle speed is low, a certain amount of cooling air is caused to reliably pass through each of the condenser 62 and the EV radiator 52 by driving the fan 34. When the vehicle speed is high, a large amount of air reliably passes through the FC radiator 42 since cooling air passes through the plural ram pressure holes 37. Further, when the vehicle speed is low, the plural ram pressure holes 37 are closed by the opening/closing member 38, whereby a certain amount of cooling air is caused to reliably pass through the FC radiator 42 by driving the fan 34. The fan 34 is provided such that cooling air is caused to pass through a part of the FC radiator 42 by driving the fan 34. Size of the fan 34 is designed such that the heat radiation performance required of the FC radiator 42 can be obtained when the vehicle speed is low.

In the heat exchange apparatus 31 in the embodiment that has been described, the FC radiator 42 in the FC cooling system 40, the EV radiator 52 in the driving device cooling system 50, and the condenser 62 in the air conditioning cooling system 60 are arranged in one plane substantially perpendicular to a direction in which the fuel cell vehicle 10 moves forward, at a front portion of the fuel cell vehicle 10. Also, the heat exchangers are arranged in order of the condenser 62, the EV radiator 52, and the FC radiator 42, that is, in order of the operating temperature at the time of heat exchange, from the upper position to the lower position. Therefore, the cooling air that is introduced when the vehicle runs can be directly supplied to the condenser 62, the EV radiator 52, and the FC radiator 42. In addition, it is possible to suppress heat transmission from the FC radiator 42 whose operating temperature is high to the condenser 62 whose operating temperature is low. That is, the FC radiator 42, the EV radiator 52, and the condenser 62 can be more appropriately arranged. Accordingly, the FC radiator 42, the EV radiator 52, and the condenser 62 can be caused to function more efficiently.

Also, in the heat exchange apparatus 31 in the embodiment, the fan 34 is provided such that the center of the fan 34 is closer to the condenser 62 than to the FC radiator 42. In addition, the fan shroud 36 is provided, and the plural ram pressure holes 37 are formed in the portion of the fan shroud 36, which covers the FC radiator 42. Therefore, when the vehicle speed is low, a certain amount of cooling air is caused to reliably pass through each of the condenser 62 and the EV radiator 52 by driving the fan 34. When the vehicle speed is high, a large amount of air reliably passes through the FC radiator 42 since cooling air passes through the plural ram pressure holes 37. As a result, it is possible to obtain the heat radiation performance required of each of the FC radiator 42, the EV radiator 52, and the condenser 62 according to the vehicle speed and the FC load. Further, the opening/closing member 38 is provided, which opens/closes the plural ram pressure holes 37 according to the vehicle speed. Therefore, when the vehicle speed is low, a certain amount of cooling air can be caused to reliably pass through the FC radiator 42 by driving the fan 34. Also, when the vehicle speed is high, a large amount of cooling air can be caused to reliably pass through the FC radiator 42 since cooling air passes through the plural ram pressure holes 37.

In the heat exchange apparatus 31 in the embodiment, the heat exchangers are arranged in order of the condenser 62, the EV radiator 52, and the FC radiator 42, that is, in order of the operating temperature at the time of heat exchange, from the upper position to the lower position. However, since the important thing is to arrange these heat exchangers in order of the operating temperature at the time of heat exchange, the heat exchangers may be arranged in order of the FC radiator 42, the EV radiator 52, and the condenser 62 from the upper position to the lower position. Also, when it is not necessary to consider the operating temperatures of the heat exchangers at the time of heat exchange, the heat exchangers may be arranged in order of the FC radiator 42, the condenser 62, and the EV radiator 52, in order of the EV radiator 52, the condenser 62, and the FC radiator 42, in order of the condenser 62, the FC radiator 42, and the EV radiator 52, or in order of the EV radiator 52, the FC radiator 42, and the condenser 62, from the upper position to the lower position.

Figure 4:
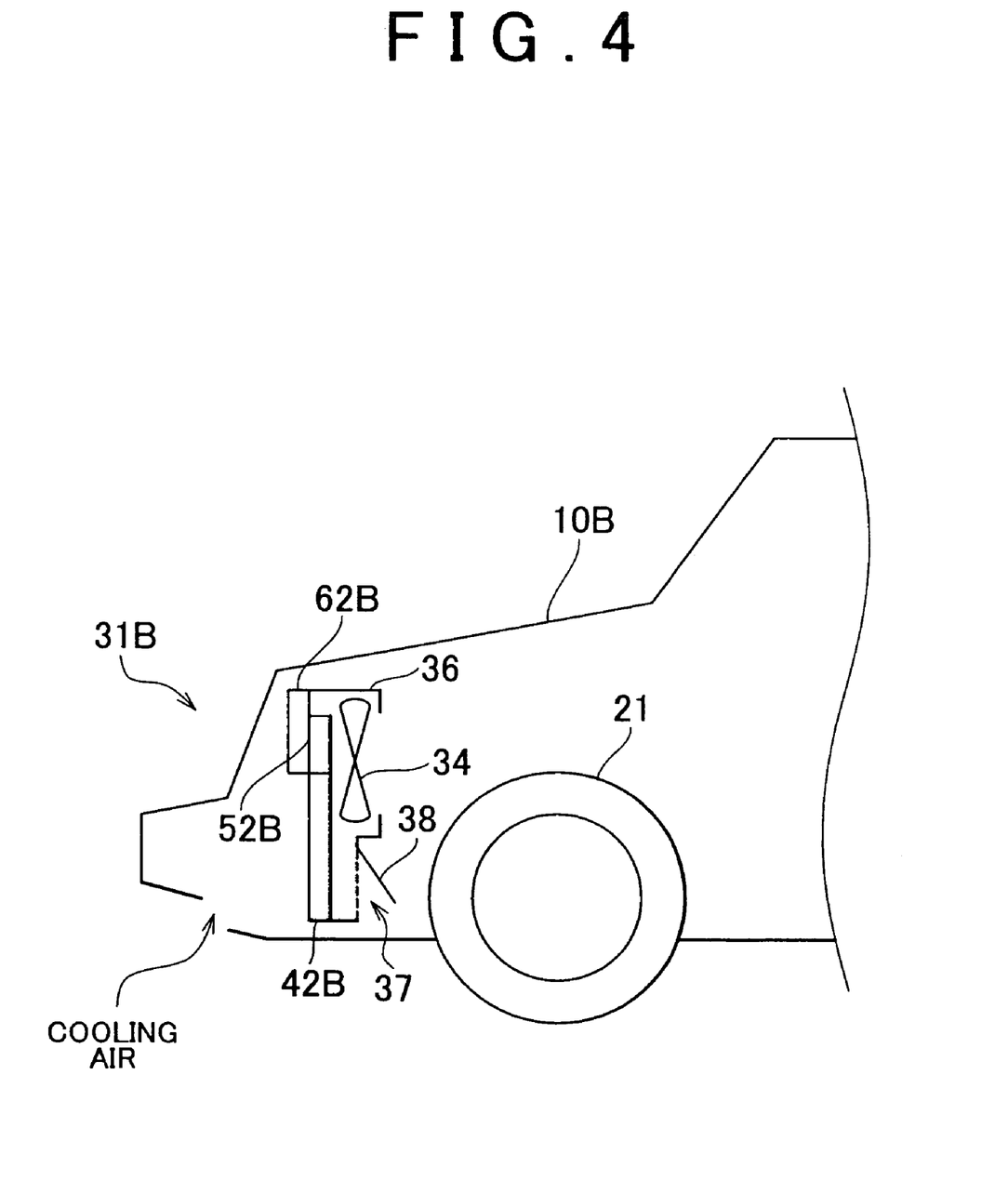
FIG. 4 is an explanatory diagram showing an example of arrangement of heat exchangers in a heat exchange apparatus 31B according to a modified example.
Figure 5:
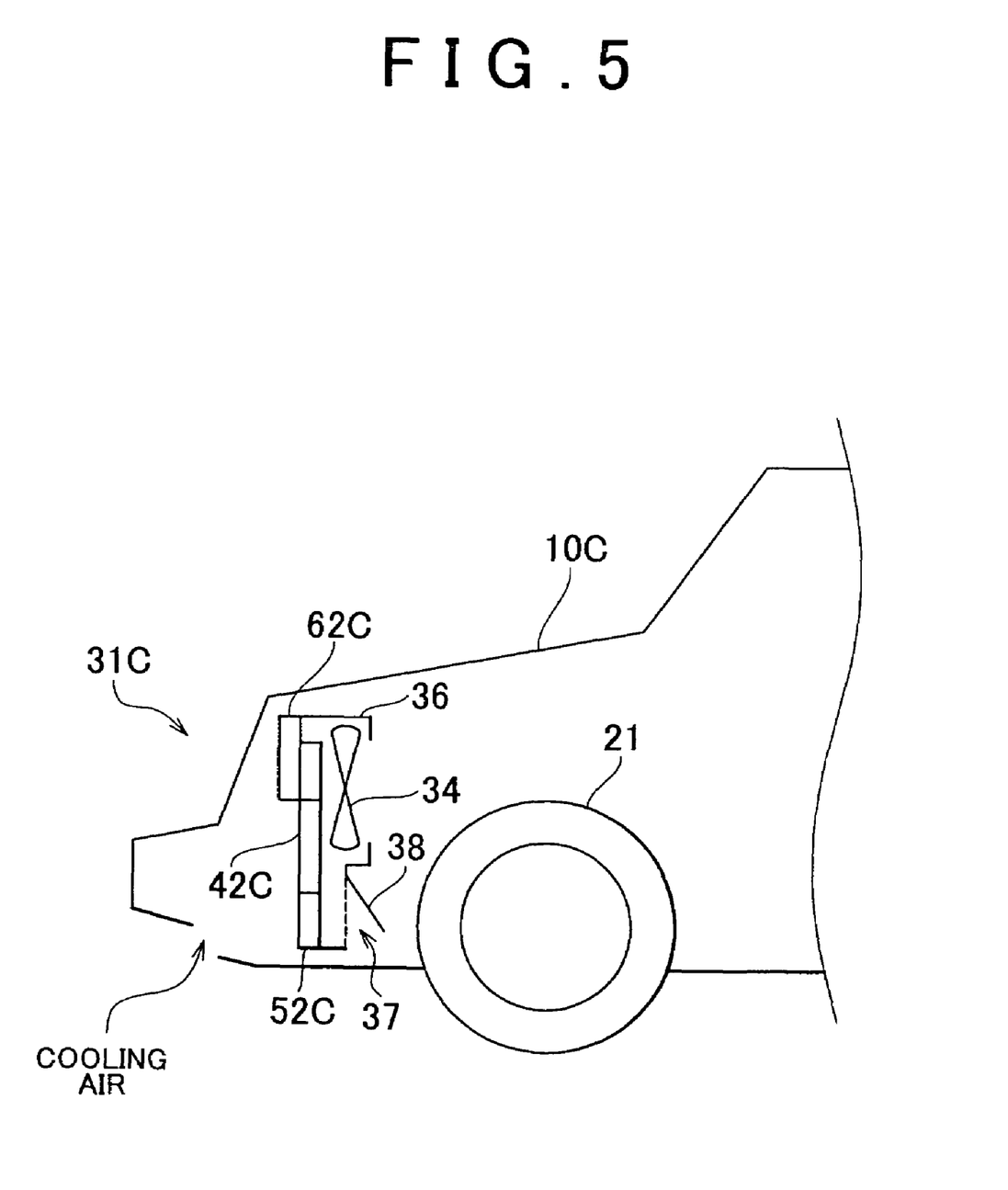
FIG. 5 is an explanatory diagram showing an example of arrangement of heat exchangers in a heat exchange apparatus 31C according to a modified example.

In the heat exchange apparatus 31 in the embodiment, the FC radiator 42, the EV radiator 52, and the condenser 62 are arranged in one plane. However, the condenser 62 may overlap at least a part of one of the EV radiator 52 and the FC radiator 42. For example, as in a fuel cell vehicle 10B according to a modified example shown in FIG. 4, a FC radiator 42B and an EV radiator 52B may be arranged in one plane substantially perpendicular to a direction in which the fuel cell vehicle 10B moves forward such that the EV radiator 52B is arranged in an upper position, and a condenser 62B may be arranged ahead of the EV radiator 52B such that the condenser 62B overlaps the EV radiator 52B. As in a fuel cell vehicle 10C according to a modified example shown in FIG. 5, a FC radiator 42C and an EV radiator 52C may be arranged in one plane substantially perpendicular to a direction in which the fuel cell vehicle 10C moves forward such that the FC radiator 42C is arranged in an upper position, and a condenser 62C may be arranged ahead of the FC radiator 42C such that the condenser 62C overlaps a part of the FC radiator 42C. Thus, since the condenser 62B is arranged so as to overlap the EV radiator 52B and the condenser 62C is arranged so as to overlap a part of the FC radiator 42C, size of one plane in which the FC radiator 42B and the EV radiator 52B in the heat exchange portion 32 are arranged can be reduced, and size of one plane in which the FC radiator 42C and the EV radiator 52C are arranged can be reduced. Also, size of the FC radiator 42B and size of the EV radiator 52B in one plane can be increased, and size of the FC radiator 42C and size of the EV radiator 52C in one plane can be increased. Therefore, thickness of each of the FC radiators 42B and 42C in a fore-and-aft direction (i.e., in a longitudinal direction of the vehicle) can be reduced, and thickness of each of the EV radiators 52B and 52C in the fore-and-aft direction (i.e., in the longitudinal direction) can be reduced.

Figure 6:
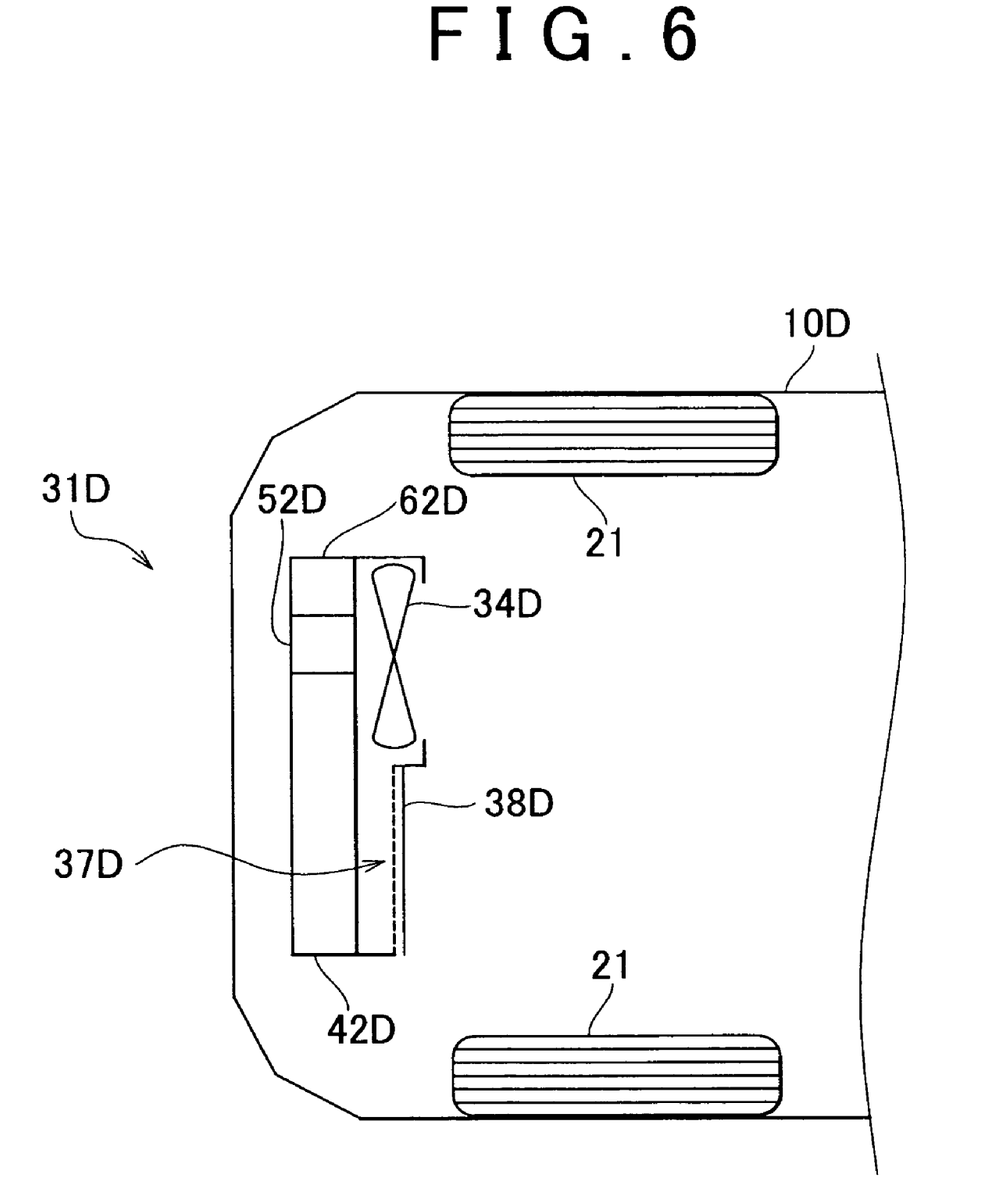
FIG. 6 is an explanatory diagram showing an example of arrangement of heat exchangers in a heat exchange apparatus 31D according to a modified example.

In the heat exchange apparatus 31 in the embodiment, the heat exchangers are arranged in order of the condenser 62, the EV radiator 52, and the FC radiator 42 in the vertical direction, from the upper position to the lower position. However, as in a fuel cell vehicle 10D according to a modified example shown in FIG. 6, the heat exchangers may be arranged in order of a FC radiator 42D, an EV radiator 52D, and a condenser 62D in a lateral direction of the vehicle, that is, in a direction perpendicular to the vertical direction. In this case, a fan 34D is provided such that a center of the fan 34D is closer to the condenser 62D than to FC radiator 42D in the lateral direction. Also, plural ram pressure holes 37D are formed in a portion of the fan shroud 36D, which covers the FC radiator 42D, and an opening/closing member 38D is fitted to the portion. In the case where the FC radiator 42D, the EV radiator 52D, and the condenser 62D are arranged in the direction perpendicular to the vertical direction in the one plane, when it is necessary to consider suppressing heat transmission from the FC radiator 42D to the condenser 62D, it is preferable to arrange the EV radiator 52D in a center position. When it is not necessary to consider suppressing heat transmission from the FC radiator 42D to the condenser 62D, the heat exchangers may be arranged in any order. Also, even in the case where the FC radiator 42D, the EV radiator 52D, and the condenser 62D are arranged in the direction perpendicular to the vertical direction in the one plane, the condenser 62D may be arranged so as to overlap at least a part of one of the EV radiator 52D and the FC radiator 42D.

In the cooling system 30 in this embodiment, the fuel cell device 12 is used as an electric power source. However, an electric power generating apparatus including an internal combustion engine and a generator may be used.

In this embodiment, the cooling system 30 including the heat exchange apparatus 31 is installed in the fuel cell vehicle 10. However, the cooling system 30 including the heat exchange apparatus 31 may be installed in moving bodies other than the vehicle, such as a ship and an airplane.

While the invention has been described with reference to preferred embodiments thereof, it is to be understood that the invention is not limited to the preferred embodiments or constructions. The invention can be achieved in various embodiments without departing from the true spirit of the invention.

What is claimed is:

1. A heat exchange apparatus which is installed in a moving body, comprising:
   a heat exchange portion in which plural heat exchangers including a heat exchanger for air conditioning that is used in an air conditioning system for a passenger compartment of the moving body and a heat exchanger for a driving source that is used for cooling the driving source of the moving body are arranged in one plane substantially perpendicular to a direction in which the moving body moves, at a front portion of the moving body;
   a fan which is arranged behind the heat exchanger for air conditioning in the heat exchange portion;
   a fan shroud which is provided so as to cover at least the heat exchanger for air conditioning; and
   a hole form member which is provided behind at least the heat exchanger for the driving source, and in which a ram pressure hole is formed.

2. The heat exchange apparatus according to claim 1, wherein the fan shroud is provided so as to cover a part of the heat exchanger for the driving source.

3. The heat exchange apparatus according to claim 1, further comprising:
   an opening/closing member which opens and closes the ram pressure hole formed in the hole form member.

4. The heat exchange apparatus according to claim 1, wherein the plural heat exchangers are arranged in a direction perpendicular to a vertical direction in the one plane.

5. The heat exchange apparatus according to claim 1, wherein the plural heat exchangers are arranged in a vertical direction in the one plane.

6. The heat exchange apparatus according to claim 5, wherein the heat exchanger for air conditioning is arranged in an uppermost position among the plural heat exchangers.

7. The heat exchange apparatus according to claim 1, wherein the plural heat exchangers are arranged in order of an operating temperature.

8. The heat exchange apparatus according to claim 1, wherein the heat exchanger for the driving source includes a heat exchanger for an electric power source, which is used for cooling the electric power source that generates electric power, and a heat exchanger for a driving device, which is used for cooling the driving device that drives the moving body using the electric power supplied from the electric power source.

9. The heat exchange apparatus according to claim 8, wherein the heat exchanger for the driving device further cools an electronic component for driving the driving device.

10. The heat exchange apparatus according to claim 8, wherein the heat exchanger for air conditioning, the heat exchanger for the driving device, and the heat exchanger for the electric power source are arranged in this order.

11. The heat exchange apparatus according to claim 8, wherein the heat exchanger for the electric power source further cools a fuel cell as the electric power source.

12. The heat exchange apparatus according to claim 8, wherein the heat exchanger for air conditioning is provided ahead of one of the heat exchanger for the electric power source and the heat exchanger for the driving device such that at least a part of the heat exchanger for air conditioning overlaps at least a part of the heat exchanger ahead of which the heat exchanger for air conditioning is provided.

13. The heat exchange apparatus according to claim 1, wherein the heat exchanger for air conditioning is provided ahead of the heat exchanger for the driving source such that at least a part of the heat exchanger for air conditioning overlaps a part of the heat exchanger for the driving source.

14. The heat exchange apparatus according to claim 1, wherein a center of the center is closer to the heat exchanger for air conditioning than to the heat exchanger for the driving source.

15. A hybrid vehicle as the moving body comprising the heat exchange apparatus according to claim 1.

* * * * *